Figure 1:
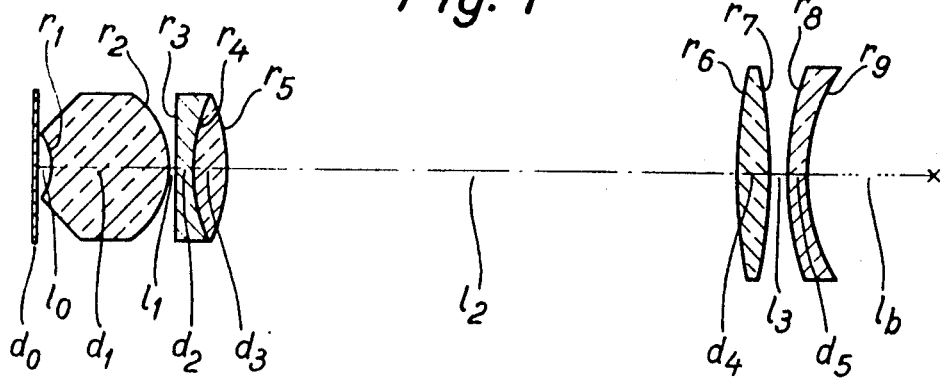

United States Patent [11] 3,592,530

| [72] | Inventor | Walter Klein<br>Wissmar, Kreis Wetzlar, Germany |
|---|---|---|
| [21] | Appl. No. | 377,912 |
| [22] | Filed | June 25, 1964 |
| [45] | Patented | July 13, 1971 |
| [73] | Assignee | Ernst Leitz G.m.b.H.<br>Wetzlar, Germany |
| [32] | Priority | July 9, 1963 |
| [33] | | Germany |
| [31] | | L 45292 IXa/42h |

[54] ANASTIGMATIC MEDIUM-POWER MICROSCOPE OBJECTIVE PROVIDING A FLATTENED IMAGE FIELD
5 Claims, 3 Drawing Figs.

[52] U.S. Cl. .................................................. 350/216, 350/220
[51] Int. Cl. ........................................... G02b 9/34, G02b 9/60, G02b 21/02
[50] Field of Search ......................................... 350/216, 220, 176, 177, 224

[56] References Cited
UNITED STATES PATENTS

| 2,206,155 | 7/1940 | Boegehold | 350/216 |
| 2,644,362 | 7/1953 | Ravizza et al. | 350/216 X |
| 3,118,964 | 1/1964 | Buzawa | 350/177 |
| 3,132,200 | 5/1964 | Muller et al. | 350/224 UX |

FOREIGN PATENTS

| 910,291 | 11/1962 | Great Britain | 350/224 |

Primary Examiner—John K. Corbin
Attorney—Erich M. H. Radde

ABSTRACT: The invention provides an anastigmatic medium-power microscope objective which provides a flattened image field and which consists of a small number of lenses divided into two groups for correcting substantially all image errors. The first group of lenses comprises a thick meniscus lens having positive refractive effect next to the object, and one or two converging lens members arranged close to each other, at least one of the latter being a doublet having a convex cemented surface facing the object. The second group of lenses consists of a simple converging lens and a simple diverging lens following the lenses of the first group along the optical axis from the object. The spacing of the two groups of lenses is appropriately designed for the desired purpose of providing an anastigmatic flattened image with these groups of lenses and is at least half the axial distance between the object and the apex.

INVENTOR:
WALTER KLEIN
BY
AGENT

ANASTIGMATIC MEDIUM-POWER MICROSCOPE OBJECTIVE PROVIDING A FLATTENED IMAGE FIELD

The present invention relates to a microscope objective providing a flattened image field, and more particularly to a medium-power objective of this type wherein a small number of objective lenses corrects all image errors to a sufficient degree.

Various constructions of microscope objectives have been proposed to flatten the image field. However, conventional anastigmatic microscope objectives are either quite expensive, i.e. they comprise lens members which are difficult to produce and/or which are large in number, or at least some of the image errors are badly corrected.

It is the primary object of the present invention to make an anastigmatic microscope objective of medium power at moderate cost.

This and other objects are accomplished by making the objective of two groups of lenses. The axial distance between the two groups of lenses is at least half the axial distance between the object and the apex of the objective lens facing the image projected by the objective. The first group of lenses next to the object consists of a negative meniscus lens of considerable axial thickness next to the object to constitute the front lens of the objective and one or two converging lens members arranged close to each other, at least one converging lens member being a doublet having a convex cemented surface facing the object. The axial distance of the converging lens members from each preceding lens is smaller than the axial thickness of such lens member. The second lens group consists of a simple converging lens and a simple diverging lens following the converging lens, starting from the object.

The great distance between the two groups of lenses permits a very good correction of all image field errors without impairing the quality of the objective along the optical axis.

Figure 2:
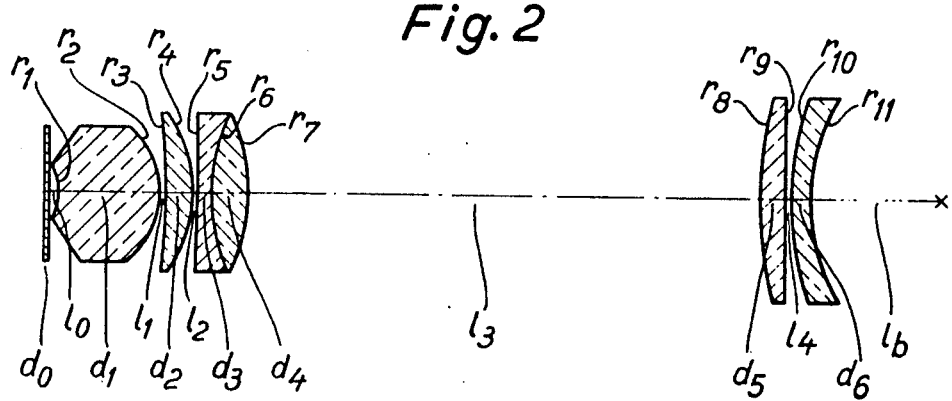
Figure 3:
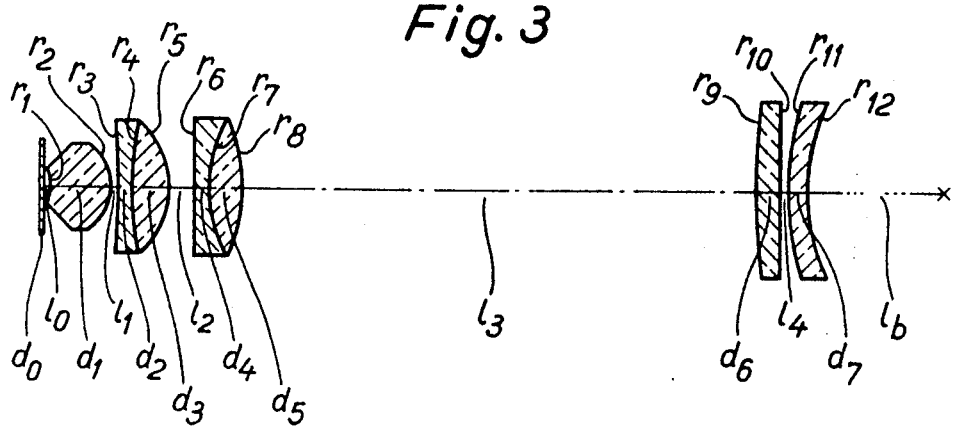

The accompanying drawing and the following tables show preferred embodiments of this invention;

FIG. 1 illustrating an embodiment with a single cemented doublet lens member in the first group, FIG. 2 showing a simple converging lens and a cemented doublet lens member in the first group, and FIG. 3 being an embodiment with two cemented doublet lens members in the first group.

In the drawing, the specification, and the claims $l_b$ designates the distance from the last objective lens to the conjugate image plane.

In the embodiment of FIG. 1, the objective has a focal length $f$ and the respective focal lengths $f_1, f_2, f_3, f_4$, and the respective axial distances between the object and the first lens, and between successive ones of said lenses $l_0, l_1, l_2, l_3$ being as follows:

TABLE I $$2.0f < f_1 < 4.0f$$
$$1.4f < f_2 < 3.0f$$
$$1.6f < f_3 < 3.2f$$
$$2.8f < -f_4 < 5.0f$$
$$0.05f < l_0 < 0.15f$$
$$0 < l_1 < 0.5f$$
$$1.8f < l_2 < 4.0f$$
$$0 < l_3 < 0.8f$$

In this embodiment, the successive radii of curvature $r_1, r_2, r_3, r_4, r_5, r_6, r_7, r_8$, and $r_9$ and the successive axial thicknesses $d_1, d_2, d_3, d_4$, and $d_5$ of said lenses, starting from the object, are as follows:

TABLE IIa $$0.35f < d_1 < 1.1f$$
$$0.20f < d_2 + d_3 < 1.0f$$
$$0.10f < d_4 < 1.0f$$
$$0.04f < d_5 < 0.8f$$
$$0.17f < -r_1 < 0.5f$$
$$0.3f < -r_2 < 0.7f$$
$$4.0f < |r_3|$$
$$0.6f < r_4 < 1.5f$$
$$0.6f < -r_5 < 1.3f$$
$$1.8f < r_6 \text{ or } 4.0f < -r_6$$
$$1.6f < -r_7 \text{ or } 4.0f < r_7$$
$$1.0f < r_8 < 3.0f$$
$$0.7f < r_9 < 1.6f$$

and the indices of refraction $n_1, n_2, n_3, n_4$, and $n_5$ for the e line of the spectrum and the dispersive indices $Y_1, Y_2, Y_3, Y_4$, and $Y_5$ or successive ones of said lenses, starting from the object, are as follows:

TABLE IIb $$n_1 > 1.55$$
$$n_2 > 1.60$$
$$n_3 < 1.70$$
$$n_4 < 1.70$$
$$n_5 > 1.60$$
$$\gamma_1 > 40$$
$$\gamma_2 < 40$$
$$\gamma_3 > 45$$
$$\gamma_4 > 40$$
$$\gamma_5 < 40$$

The constructional data for a fully corrected example of the type shown in FIG. 1 are given in the following table:

TABLE III

| Radii | Axial distances and thicknesses | $n_e$ | $\nu_e$ |
|---|---|---|---|
| | $d_0 = 0.17$ | | |
| | $l_0 = 0.794$ | | |
| $r_1 = -3.16$ | | 1.52491 | 58.3 |
| | $d_1 = 7.0$ | 1.61022 | 49.0 |
| $r_2 = -4.982$ | | | |
| | $l_1 = 0.4$ | | |
| $r_3 = \infty$ | | | |
| | $d_2 = 1.0$ | 1.76860 | 26.3 |
| $r_4 = +9.84$ | | | |
| | $d_3 = 2.0$ | 1.60973 | 59.2 |
| $r_5 = -9.84$ | | | |
| | $l_2 = 30.25$ | | |
| $r_6 = +29.232$ | | | |
| | $d_4 = 2.0$ | 1.56606 | 60.5 |
| $r_7 = -29.232$ | | | |
| | $l_3 = 1.0$ | | |
| $r_8 = +18.026$ | | | |
| | $d_5 = 1.1$ | 1.73430 | 28.1 |
| $r_9 = +10.938$ | | | |
| | $l_b = 151.3$ | | |

$\beta'e = -16.20$
$f_e = 10.51$
$A = 0.40$
$\Sigma P = -0.001$
$\Sigma \Gamma = +0.019$.

In the table, $\beta'e$ is the magnification of the microscope, $f_e$ is the focal length of the entire optical system, A is the aperture, $\sigma P$ is the Seidel coefficient for the Petzval curvature of the Petzval surface, and $\Sigma \Gamma$ is the Seidel coefficient for the astigmatism.

In an objective with a magnification of about 25 : 1 and an aperture of about 0.5, it is preferred to use two converging lens members in the first group. In one embodiment of such an objective, as shown in FIG. 2, the respective focal lengths $f_1, f_2, f_3, f_4, f_5$ and the respective axial distances between the object and the first lens, and between successive ones of said lenses $l_0, l_1, l_2, l_3, l_4$ being as follows:

TABLE IV $$8f < f_1$$
$$1.6f < f_2 < 3.2f$$
$$3.0f < f_3 < 6.0f$$
$$4.0f < f_4 < 10.0f$$
$$5.0f < -f_5 < 10.0f \quad \text{or } 20f < -f_1$$
$$0.05f < l_0 < 0.15f$$
$$0 < l_1 < 0.5f$$
$$0 < l_2 < 0.6f$$
$$3.0f < l_3 < 6.0f$$
$$0 < l_4 < 1.0f$$

In this embodiment, the successive radii of curvature $r_1, r_2, r_3, r_4, r_5, r_6, r_7, r_8, r_9, r_{10}$, and $r_{11}$ and the successive axial thicknesses $d_1, d_2, d_3, d_4, d_5$, and $d_6$ of said lenses, starting from the object, are as follows:

TABLE Va $$0.5f < d_1 < 1.5f$$
$$0.1f < d_2 < 0.8f$$
$$0.25f < d_3 + d_4 < 1.2f$$
$$0.15f < d_5 < 1.5f$$
$$0.07f < d_6 < 1.5f$$
$$0.3f < -r_1 < 0.7f$$
$$0.5f < -r_2 < 1.2f$$
$$3.0f < -r_3$$
$$0.7f < -r_4 < 1.8f \quad \text{or } 7.0f < r_3$$
$$6.0f < |-r_5|$$
$$0.9f < r_6 < 2.0f$$
$$0.9f < -r_7 < 2.0f$$
$$2.4f < r_8 < \infty$$
$$5.0f < |-r_9|$$
$$1.8f < r_{10} < 4.0f$$
$$1.2f < r_{11} < 2.5f$$

and the indices of refraction $n_1$, $n_2$, $n_3$, $n_4$, $n_5$ and $n_6$ for the $e$ line of the spectrum and the dispersive indices $Y_1$, $Y_2$, $Y_3$, $Y_4$, $Y_5$, and $Y_6$ of successive ones of said lenses, starting from the object, are as follows:

TABLE Vb $n_1 > 1.50$ .. $\nu_1 > 40$
$n_2 > 1.50$ .. $\nu_2 > 40$
$n_3 > 1.65$ .. $\nu_3 < 45$
$n_4 < 1.65$ .. $\nu_4 > 40$
$n_5 > 1.50$ .. $\nu_5 > 40$
$n_6 > 1.60$ .. $\nu_6 < 45$

The constructural data for this embodiment of the type shown in Figure 2 are given in the following table:

TABLE VI

| Radii | Axial distances and thicknesses | $n_e$ | $\nu_e$ |
|---|---|---|---|
|  | $d_0 = 0.17$ | 1.52491 | 58.3 |
|  | $l_0 = 0.594$ |  |  |
| $r_1 = -3.03$ |  |  |  |
|  | $d_1 = 6.0$ | 1.57125 | 55.8 |
| $r_2 = -5.05$ |  |  |  |
|  | $l_1 = 0.3$ |  |  |
| $r_3 = -43.29$ |  |  |  |
|  | $d_2 = 1.65$ | 1.57125 | 55.8 |
| $r_4 = -7.877$ |  |  |  |
|  | $l_2 = 0.2$ |  |  |
| $r_5 = -211.88$ |  |  |  |
|  | $d_3 = 0.9$ | 1.79192 | 25.5 |
| $r_6 = +10.55$ |  |  |  |
|  | $d_4 = 2.2$ | 1.57066 | 63.0 |
| $r_7 = -10.55$ |  |  |  |
|  | $l_3 = 30.3$ |  |  |
| $r_8 = +23.392$ |  |  |  |
|  | $d_5 = 1.5$ | 1.57486 | 57.3 |
| $r_9 = \infty$ |  |  |  |
|  | $l_4 = 0.3$ |  |  |
| $r_{10} = +17.6$ |  |  |  |
|  | $d_6 = 1.2$ | 1.67764 | 32.0 |
| $r_{11} = +11.32$ |  |  |  |
|  | $l_b = 151.7$ |  |  |

$\beta'e = -24.84$
$f_e = 6.99$
$A = 0.50$
$\Sigma P = +0.018$
$\Sigma \Gamma = +0.014$.

wherein $\beta'e$ is the total magnification, $f_e$ is the focal length of the objective, A is the aperture, and $\Sigma \rho$ and $\Sigma \Gamma$ are indices used in Seidel's equations where $\Sigma 92$ and $\Sigma$FIG. are the same as defined above for table III.

A further increase in the magnification and of the aperture requires two cemented doublets in the first group of lenses according to the present invention. For a magnification of 40 and an aperture of 0.65, for instance, an objective is shown in FIG. 3. The respective focal lengths $f_1$, $f_2$, $f_3$, $f_4$, and $f_5$ and the respective axial distances between the object and the first lens, and between successive ones of said lenses $l_0$, $l_1$, $l_2$, $l_3$, and $l_4$ are as follows:

TABLE VII

| | |
|---|---|
| $1.5f$ | $<f_1$ $<3.0f$ |
| $2.0f$ | $<f_2$ $<4.0f$ |
| $4.0f$ | $<f_3$ $<10.0f$ |
| $8.0f$ | $<f_4$ $<20.0f$ |
| $10.0f$ | $<-f_5$ $<20.0f$ |
| $0.05f$ | $<l_0$ $<0.15f$ |
| $0$ | $<l_1$ $<0.7f$ |
| $0$ | $<l_2$ $<1.0f$ |
| $4.5f$ | $<l_3$ $<9.0f$ |
| $0$ | $<l_4$ $<1.6f$ |

In this embodiment, the successive radii of curvature $r_1$, $r_2$, $r_3$, $r_4$, $r_5$, $r_6$, $r_7$, $r_8$, $r_9$, $r_{10}$, $r_{11}$, and $r_{12}$ and the successive axial thicknesses, $d_1$, $d_2$, $d_3$, $d_4$, $d_5$, $d_6$, and $d_7$ of said lenses, starting from the object, are as follows:

TABLE VIIIa

| | |
|---|---|
| $0.5f$ | $<d_1$ $<1.5f$ |
| $0.4f$ | $<d_2+d_3$ $<1.3f$ |
| $0.4f$ | $<d_4+d_5$ $<1.3f$ |
| $0.15f$ | $<d_6$ $<2.0f$ |
| $0.1f$ | $<d_7$ $<2.0f$ |
| $0.35f$ | $<-r_1$ $<1.0f$ |
| $0.5f$ | $<-r_2$ $<1.2f$ |
| $6f$ | $<|r_3|$ |
| $1.5f$ | $<r_4$ $<6.0f$ |
| $0.7f$ | $<-r_5$ $<2.0f$ |
| $8f$ | $<|r_6|$ |
| $1.2f$ | $<r_7$ $<5f$ |
| $1.5f$ | $<-r_8$ $<3f$ |
| $5f$ | $<|r_9|$ |
| $5f$ | $<|r_{10}|$ |
| $2.5f$ | $<r_{11}$ $<6f$ |
| $1.8f$ | $<r_{12}$ $<4f$ | and the indices of refraction $n_1$, $n_2$, $n_3$, $n_4$, $n_5$, $n_6$, and $n_7$ for the $e$-line of the spectrum and the dispersive indices $Y_1$, $Y_2$, $Y_3$, $Y_4$, $Y_5$, $Y_6$, and $Y_7$ of successive ones of said lenses, starting from the object are as follows:

TABLE VIIIb $n_1 > 1.60$ .. $\nu_1 < 45$
$n_2 > 1.65$ .. $\nu_2 < 45$
$n_3 < 1.65$ .. $\nu_3 > 45$
$n_4 > 1.65$ .. $\nu_4 < 45$
$n_5 < 1.65$ .. $\nu_5 > 45$
$n_6 > 1.60$ .. $\nu_6 < 45$
$n_7 > 1.55$ .. $\nu_7 < 50$

The constructural data for this embodiment of the type shown in Figure 3 are given in the following table:

TABLE IX

| Radii | Axial distances and thicknesses | $n_e$ | $\nu_e$ |
|---|---|---|---|
|  | $d_0 = 0.17$ | 1.52491 | 58.3 |
|  | $l_0 = 0.312$ |  |  |
| $r_1 = -2.45$ |  |  |  |
|  | $d_1 = 3.56$ | 1.72311 | 29.3 |
| $r_2 = -2.922$ |  |  |  |
|  | $l_1 = 0.3$ |  |  |
| $r_3 = -51.111$ |  |  |  |
|  | $d_2 = 0.8$ | 1.79192 | 25.5 |
| $r_4 = +18.793$ |  |  |  |
|  | $d_3 = 2.12$ | 1.52010 | 65.0 |
| $r_5 = -5.081$ |  |  |  |
|  | $l_2 = 1.5$ |  |  |
| $r_6 = \infty$ |  |  |  |
|  | $d_4 = 0.9$ | 1.79192 | 25.5 |
| $r_7 = +7.024$ |  |  |  |
|  | $d_5 = 2.0$ | 1.57066 | 63.0 |
| $r_8 = -9.50$ |  |  |  |
|  | $l_3 = 30.35$ |  |  |
| $r_9 = +40.328$ |  |  |  |
|  | $d_6 = 1.5$ | 1.72311 | 29.3 |
| $r_{10} = \infty$ |  |  |  |
|  | $l_4 = 0.3$ |  |  |
| $r_{11} = +16.759$ |  |  |  |
|  | $d_7 = 1.2$ | 1.62985 | 38.8 |
| $r_{12} = +11.47$ |  |  |  |
|  | $l_b = 152.0$ |  |  |

$\beta'e = -39.67$
$f_e = 4.53$
$A = 0.65$
$\Sigma P = +0.054$
$\Sigma \Gamma = +0.011$ wherein $\beta'e$ is the total magnification, $f_e$ is the focal length of the objective, A is the aperture, and $\Sigma \rho$ and $\Sigma \Gamma$ are indices used in Seidel's equations where $\Sigma \rho$ and $\Sigma \Gamma$ are the same as defined above for table III.

I claim:

1. In an improved anastigmatic medium-power flat field microscope objective having a first and a second group of lenses positioned along an optical axis, the first group of lenses being positioned nearest to the object plane and consisting of a thick negative meniscus converging lens constituting the front lens of the object and a converging doublet having a convex cemented surface facing the object, and the second group of lenses being positioned farthest from the object plane consisting of a simple converging lens and a simple diverging lens positioned the farthest away from the object, the axial distance between the lenses of the first group and the axial thickness of the front lens of the objective being such that the axial distance of the converging doublet from the front lens is smaller than the axial thickness of the front lens, and the axial distance between the first and second group of lenses being at least half the axial distance between the object and the apex of the objective lens facing the image projected by the objective, and wherein the parameters of the lenses are as follows:

| Radii | Axial distances and thicknesses | $n_e$ | $\nu_e$ |
|---|---|---|---|
|  | $d_0=0.17$ | 1.52491 | 58.3 |
| $r_1=-3.16$ | $l_0=0.794$ |  |  |
| $r_2=-4.982$ | $d_1=7.0$ | 1.61022 | 49.0 |
| $r_3=\infty$ | $l_1=0.4$ |  |  |
| $r_4=+9.84$ | $d_2=1.0$ | 1.76860 | 26.3 |
| $r_5=-9.84$ | $d_3=2.0$ | 1.60973 | 59.2 |
| $r_6=+29.232$ | $l_2=30.25$ |  |  |
| $r_7=-29.232$ | $d_4=2.0$ | 1.56606 | 60.5 |
| $r_8=+18.026$ | $l_3=1.0$ |  |  |
| $r_9=+10.938$ | $d_5=1.1$ | 1.73430 | 28.1 |
|  | $l_b=151.3$ |  |  |

$\beta'e = -16.20$
$f_e = 10.51$
$A = 0.40$
$\Sigma P = -0.001$
$\Sigma \Gamma = +0.019$.

wherein $\beta'e$ is the total magnification, $f_e$ is the focal length of the objective, A is the aperture, and $\Sigma\rho$ and $\Sigma\Gamma$ are indices used in Seidel's equations.

2. In an improved anastigmatic medium-power flat field microscope objective having a first and a second group of lenses positioned along an optical axis, the first group of lenses being positioned nearest to the object plane and consisting of a thick negative meniscus, converging lens constituting the front lens of the objective and two cemented converging doublets at least one having a convex cemented surface facing the object, and the second group of lenses being positioned farthest from the object plane consisting of a simple converging lens and a simple diverging lens positioned farthest away from the object, the axial distance between the lenses of the first group being such that the axial distance of the converging doublets from each preceding lens is smaller than the axial thickness of the preceding lens, and the axial distance between the first and second group of lenses being at least half the axial distance between the object and the apex of the objective lens facing the image projected by the objective.

3. The microscope objective of claim 2, wherein the parameters of the lenses are as follows.

wherein $\beta'e$ is the total magnification, $f_e$ is the focal length of the objective, A is the aperture, and $\Sigma\rho$ and $\Sigma\Gamma$ are indices used in Seidel's equations.

4. In an improved anastigmatic medium-power flat field microscope objective having a first and a second group of lenses positioned along an optical axis, the first group of lenses being positioned nearest to the object plane and consisting of a thick negative meniscus, converging lens constituting the front lens of the objective, a converging doublet having a convex cemented surface facing the object and a simple converging lens positioned between the front lens and the doublet, and

| Radii | Axial distances and thicknesses | $n_e$ | $\nu_e$ |
|---|---|---|---|
|  | $d_0=0.17$ | 1.52491 | 58.3 |
| $r_1=-2.45$ | $l_0=0.312$ |  |  |
| $r_2=-2.922$ | $d_1=3.56$ | 1.72311 | 29.3 |
| $r_3=-51.111$ | $l_1=0.3$ |  |  |
| $r_4=+18.793$ | $d_2=0.8$ | 1.79192 | 25.5 |
| $r_5=-5.081$ | $d_3=2.12$ | 1.52010 | 65.0 |
| $r_6=\infty$ | $l_2=1.5$ |  |  |
| $r_7=+7.924$ | $d_4=0.9$ | 1.79192 | 25.5 |
| $r_8=-9.50$ | $d_5=2.0$ | 1.57086 | 63.0 |
| $r_9=+40.328$ | $l_3=30.35$ |  |  |
| $r_{10}=\infty$ | $d_6=1.5$ | 1.72311 | 29.3 |
| $r_{11}=+16.759$ | $l_4=0.3$ |  |  |
| $r_{12}=+11.47$ | $d_7=1.2$ | 1.62985 | 38.8 |
|  | $l_b=152.0$ |  |  |

$\beta'e = -30.67$
$f_e = 4.53$
$A = 0.65$
$\Sigma P = +0.054$
$\Sigma \gamma = +0.011$ the second group of lenses being positioned farthest from the object plane consisting of a simple converging lens and a simple diverging lens positioned farthest away from the object, the axial distance between the lenses of the first group being such that the axial distance of the converging lenses from each preceding lens is smaller than the axial thickness of the preceding lens, and the axial distance between the first and second group of lenses being at least half the axial distance between the object and the apex of the objective lens facing the image projected by the objective.

5. The microscope objective of claim 4, wherein the parameters of the lenses are as follows:

| Radii | Axial distances and thicknesses | $n_e$ | $\nu_e$ |
|---|---|---|---|
|  | $d_0=0.17$ | 1.52491 | 58.3 |
| $r_1=-3.03$ | $l_0=0.594$ |  |  |
| $r_2=-5.05$ | $d_1=6.0$ | 1.57125 | 55.8 |
| $r_3=-43.29$ | $l_1=0.3$ |  |  |
| $r_4=-7.877$ | $d_2=1.65$ | 1.57125 | 55.8 |
| $r_5=-211.88$ | $l_2=0.2$ |  |  |
| $r_6=+10.55$ | $d_3=0.9$ | 1.79192 | 25.5 |
| $r_7=-10.55$ | $d_4=2.2$ | 1.57086 | 63.0 |
| $r_8=+23.392$ | $l_3=30.3$ |  |  |
| $r_9=\infty$ | $d_5=1.5$ | 1.57486 | 57.3 |
| $r_{10}=+17.6$ | $l_4=0.3$ |  |  |
| $r_{11}=+11.32$ | $d_6=1.2$ | 1.67764 | 32.0 |
|  | $l_b=151.7$ |  |  |

$\beta'e=-24.84$
$f_e=6.99$
$A=0.50$
$\Sigma P=+0.018$
$\Sigma \Gamma=+0.014$.

wherein $\beta'e$ is the total magnification, $f_e$ is the focal length of the objective, A is the aperture, and $\Sigma\rho$ and $\Sigma\Gamma$ are indices used in Seidel's equations.

UNITED STATES PATENT OFFICE
CERTIFICATE OF CORRECTION

Patent No. 3,592,530          Dated July 13, 1971

Inventor(s) Walter Klein

It is certified that error appears in the above-identified patent and that said Letters Patent are hereby corrected as shown below:

Column 2, line 42, "$\sigma P$" should read --- $\Sigma P$ ---. Column 3, line 48, "$\Sigma \rho$" should read --- $\Sigma P$ ---. Column 4, line 65, "$\Sigma \rho$" should be --- $\Sigma P$ --- and line 66, "$\Sigma \rho$" should be --- $\Sigma P$ ---. Column 5, line 39, "$\Sigma \rho$" should be --- $\Sigma P$ ---, line 59, the period (.) should be a colon (:), between lines 59 and 60 the following table should be inserted:

| Radii | Axial distances and thicknesses | $n_e$ | $\nu_e$ |
|---|---|---|---|
|  | $d_0 = 0.17$ | 1.52491 | 58.3 |
|  | $l_0 = 0.312$ |  |  |
| $r_1 = -2.45$ | $d_1 = 3.56$ | 1.72311 | 29.3 |
| $r_2 = -2.922$ | $l_1 = 0.3$ |  |  |
| $r_3 = -51.111$ | $d_2 = 0.8$ | 1.79192 | 25.5 |
| $r_4 = +18.793$ | $d_3 = 2.12$ | 1.52010 | 65.0 |
| $r_5 = -5.081$ | $l_2 = 1.5$ |  |  |
| $r_6 = \infty$ | $d_4 = 0.9$ | 1.79192 | 25.5 |
| $r_7 = +7.924$ | $d_5 = 2.0$ | 1.57086 | 63.0 |
| $r_8 = -9.50$ | $l_3 = 30.35$ |  |  |

UNITED STATES PATENT OFFICE
CERTIFICATE OF CORRECTION

Patent No. 3,592,530                Dated July 13, 1971

Inventor(s) Walter Klein

It is certified that error appears in the above-identified patent and that said Letters Patent are hereby corrected as shown below:

- Page 2 -

| | | |
|---|---|---|
| $r_9 = +40.328$ | $d_6 = 1.5$ | 1.72311     29.3 |
| $r_{10} = \infty$ | $l_4 = 0.3$ | |
| $r_{11} = +16.759$ | $d_7 = 1.2$ | 1.62985     38.8 |
| $r_{12} = +11.47$ | $l_b = 152.0$ | |

$\beta'e = -39.67$     $\Sigma P = +0.054$ $f_e = 4.53$     $\Sigma \Gamma = +0.011$ $A = 0.65$ and line 61, "$\Sigma \rho$" should be ---$\Sigma P$---.

Column 6, delete lines 1 through 29, inclusive; line 69, "$\Sigma \rho$" should be ---$\Sigma P$---.

Signed and sealed this 20th day of June 1972.

(SEAL)
Attest:

EDWARD M. FLETCHER, JR.
Attesting Officer

ROBERT GOTTSCHALK
Commissioner of Patents